Dec. 1, 1942.  S. C. CARNEY  2,303,609
CRUDE OIL CONDITIONING AND SEPARATING PROCESS
Filed June 10, 1940
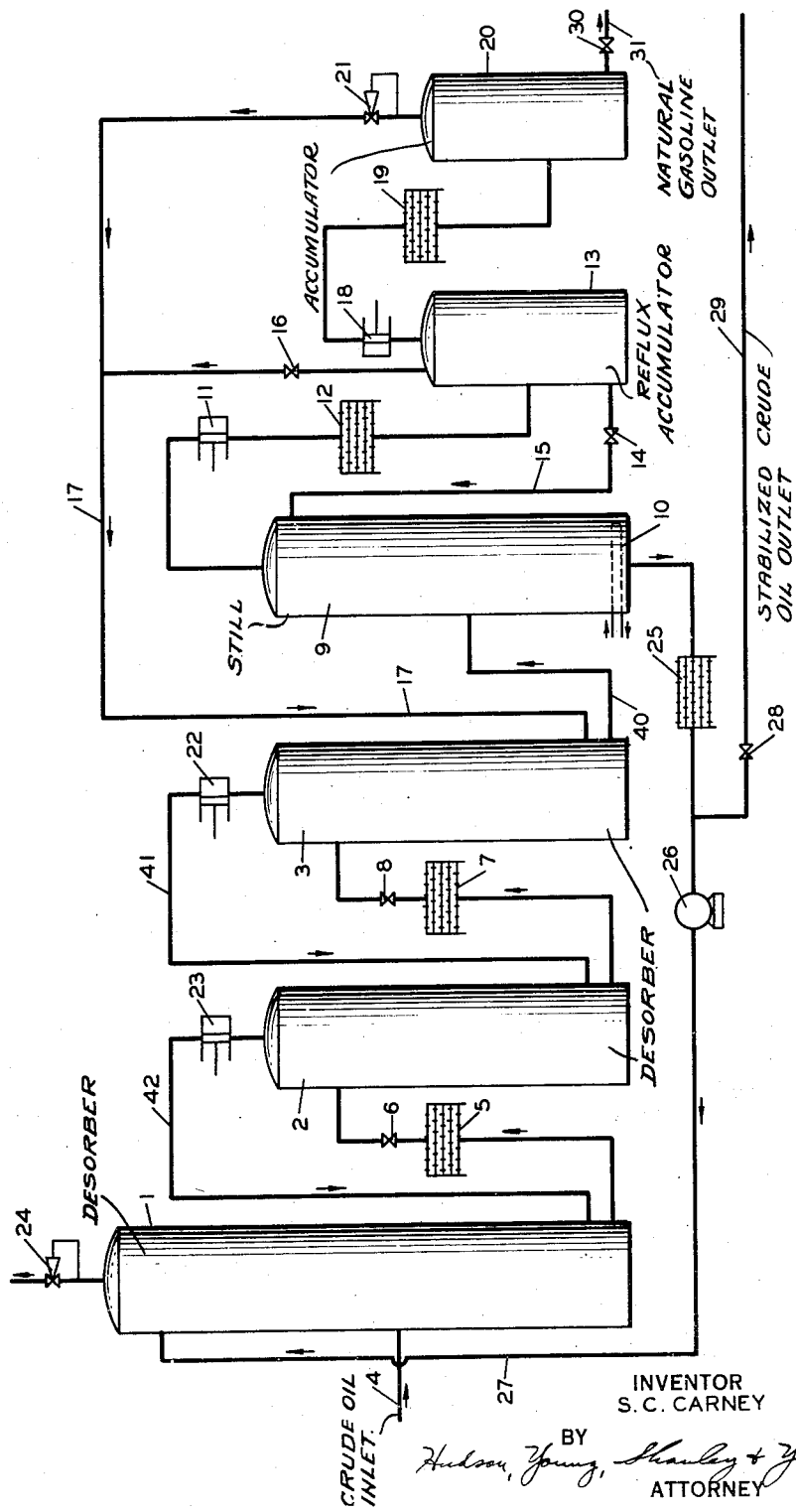
INVENTOR
S. C. CARNEY
BY
Hudson, Young, Shanley & Yunger
ATTORNEY Patented Dec. 1, 1942

2,303,609

UNITED STATES PATENT OFFICE 2,303,609

CRUDE OIL CONDITIONING AND SEPARATING PROCESS

Samuel C. Carney, Bartlesville, Okla., assignor to Phillips Petroleum Company, a corporation of Delaware Application June 10, 1940, Serial No. 339,832

9 Claims. (Cl. 196—73)

This invention relates to the separation of the more volatile components from a fluid mixture. More particularly it relates to the separation from crude oils of normally gaseous components and the lighter components ordinarily known as polymerization feed stock and natural gasoline.

This invention is particularly adaptable to the removal of methane from the mixture of oil and gas produced from oil wells and the separation of the demethanized mixture into commercially desirable fractions among which may be included natural gasoline and polymerization feed stocks. By application of this invention, substantially all of the propane and a large part of the ethane present in such a mixture may be recovered as a liquid.

In the production of oil, the fluid produced from an oil well comprises oil associated with varying amounts of gas. A portion of this gas accompanying the oil is undesirable and it is advantageous to remove it before the oil is sent to the refinery or to storage. Methane dissolved in the oil to be processed is undesirable since it seriously interferes with rectification by hindering condensation of reflux. Prior to the introduction of modern refining processes, such as polymerization, the lighter hydrocarbons were useful only as gaseous fuel. Butanes, propane and ethane when dehydrogenated are commercially valuable as polymerization feed stocks, in addition, the butanes and propane are finding a ready market as liquefied petroleum gases.

The problem of separating the undesirable gases from newly produced crude oil has changed considerably with the progress in refining. Practice heretofore was to allow the gases associated with the oil to be evolved in gas traps or low pressure oil and gas separators at the wells. This method of treatment removes the methane, but in addition, large quantities of ethane, propane, and butanes are lost. As the refining industry developed, attempts were made to remove methane without loss of substantial amounts of these heavier hydrocarbons. Such attempts resulted in the development of a number of methods for treating hydrocarbon liquids for the removal of methane, some of which removed substantially all of the methane but only at the expense of losing much of the ethane and some of the propane and the butanes. An economic balance, therefore, must be established between the value of the desirable components lost and the cost of rectification which latter increases as the percentage of unremoved methane increases.

Although methane is cited throughout this specification as the undesirable gas, or gas to be removed, it is to be understood that the principles set forth may be applied to the removal of the lightest component from a mixture.

One of the objects of this invention is to provide a means for effecting an efficient separation between methane and the heavier hydrocarbons.

A further object of this invention is to provide an improved process for separating the most volatile components from a fluid mixture.

A still further object of this invention is to provide an improved process for the separation of those light components ordinarily known as polymerization feed stock and natural gasoline from a fluid mixture, without permitting appreciable loss of these light hydrocarbons in the separated methane.

Other objects will be apparent from the following detailed description.

These objects are accomplished by retaining the light components in the original liquid phase as produced from the wells under pressure during the time in which the methane is being removed therefrom. After the methane removal is essentially completed, the light hydrocarbons comprising the polymerization feed stock and natural gasoline are removed from this liquid phase by the known process of rectification. Broadly speaking my invention is intended to make use of high pressure methane removal and rectification processes for the extraction of light hydrocarbons from the liquid oil mixtures. This simple procedure may be contrasted with the known processes involving low pressure gas removal and recovery of the light hydrocarbons from this separated gas phase by absorption, distillation and stabilization.

The physical condition which makes my rectification process advantageous is that after removal of methane under high pressure from the crude oil mixture, the concentration of the hydrocarbons comprising natural gasoline and polymerization feed stocks is much greater in the methane-free residual liquid than the concentration of these components in the gaseous phase containing all the methane, which gaseous phase resulted from the separation of light hydrocarbons from the crude oil mixture when using low pressure separation. The advantage in thus using rectification instead of absorption basically depends on the fact that a gallon of propane, for example, when in the liquid phase occupies a volume of a little more than ⅛ of a cubic foot, while a gallon of propane in the vapor phase even at 200 pounds pressure, occupies 2.34 cubic feet, a volume seventeen times as great. But this volume is seventeen times as great for the pure substance in the vapor phase, but when mixed with methane, as when an absorption plant is used for its recovery, its concentration in the usual 30 pound gas is around 7,000 times less than when it is delivered as liquid polymerization feed stock.

This concentration factor is so important in separation and utilization that it is in fact the chief function of the absorption process to change the components from the gaseous phase back into a concentrated liquid phase. Although modern oil production methods maintain the pressure on the producing formation and separate gas from the liquid by the use of one or more traps, the so-called stage separation, at pressures as high as 1,000 pounds per square inch, the absorption process is still used for recovery of desirable components from the gas so separated.

The absorption process when used for recovery of desirable components from the gases of different concentrations and different pressures from these traps, still leaves it desirable that the dry gas residues from its absorbers be compressed up to the highest trap pressure for reinjection into the producing formation. My process makes use of the compression of the uncondensible gas to injection pressure to assist in the elimination of methane from the liquid phase and to retain components heavier than methane in the liquid phase.

The advantage in efficiency of rectification of the liquid phase over absorption from the gaseous phase is marked. While absorption always delivers some of every gaseous component into its product and its product must then be fractionated or stabilized, etc., rectification gives such an excellent separation that further purification of product is frequently unnecessary.

The monetary advantage of my process over the prior art is that it uses as its principal apparatus essentially the traps otherwise used in lowering the pressure on the liquid phase. I merely equip them with some of the known bubble plates. The still used in my process is the known rectifying column but is smaller and requires less heat than an absorption plant still for equivalent production, because volatile constituents heavier than methane are present in the crude oil charged to it in much higher concentration than they are in the rich oil in an absorption plant. The condensing system and rectification system are the same in principle as those used with absorption plants but operate at lower pressures because of the absence of methane in the vapors to be condensed.

The drawing shows one modification of my crude oil conditioning and separating unit. Referring to the drawing, units 1, 2 and 3 are plate columns herein called desorbers. Desorber 1 operates at a pressure near that of the well head, while desorbers 2 and 3 are operated at successively lower pressures as will be defined later in this specification. The well fluid from high pressure wells (500 pounds per square inch or higher) enters the middle portion of the desorber 1 through line 4. Oil from the base of desorber 1 flows through cooler 5 and control valve 6 to the top of desorber 2, and oil from the base of desorber 2 flows thrugh cooler 7 and control valve 8 to the top of desorber 3. From the base of desorber 3 the oil flows through line 40 to a still 9 which may be a conventional bubble plate rectifying column with means 10 for supplying heat to the base of the column.

Vapors passing overhead from still 9 are passed to compressor 11 where the pressure is increased and then through cooler 12 to the reflux accumulator 13. Condensate collected in the reflux accumulator 13 is returned through control valve 14 and line 15 to the top of still 9 to reflux the still.

A portion of the uncondensed vapors are passed through control valve 16 and pipe 17 to the base of desorber 3. The remainder of the vapor is further compressed by compressor 18 and passed through condenser 19 for condensation. The condensate formed is collected in accumulator 20 which is provided with a back-pressure regulating valve 21 to maintain a definite pressure on accumulator 20. Any gases or uncondensed vapors passing the back-pressure regulating valve 21 are conducted by pipe 17 along with gas from reflux accumulator 13 to the base of desorber 3.

Gas and vapors from desorber 3 are compressed by compressor 22 and passed through line 41 to the base of desorber 2. Gases and vapors from desorber 2 are compressed by compressor 23 and passed through line 42 to the base of desorber 1. It will thus be apparent that in units 1, 2 and 3 gases and vapors from unit to unit are brought into countercurrent contact with the liquid passing from unit to unit.

Undesirable gases are removed from the top of desorber 1 through a back-pressure regulating valve 24. Conditioned crude oil is withdrawn from the base of still 9 and passed through cooler 25 to reduce its temperature after which the oil stream is divided, a part of it being passed to the top of desorber 1 through pump 26 and line 27 and the remainder being withdrawn through valve 28 and line 29 as a stabilized crude product. The desirable lighter components are withdrawn from the system through valve 30 and line 31.

In operation, the well fluid from high pressure wells (500 pounds per square inch or higher) enters the system through line 4. The well fluid enters the plate type column herein called desorber 1, at a point intermediate the ends of the column. The pressure of desorber 1 is maintained at or near the well head pressure by the back pressure regulating valve 24 at the top of the column. Any gases or vapors evolved from the well fluid pass upwardly through the bubble caps in the plates above inlet line 4 and are countercurrently contacted by the stream of cooled gas-free oil introduced through line 27 to the top of the column. The liquid flowing downward over the plates below inlet line 4 is countercurrently contacted with gas delivered to the base of the column by compressor 23 and line 42.

The oil from the base of desorber 1, after being cooled in cooler 5, is admitted through control valve 6 to the top of desorber 2, which is operated at a lower pressure than that maintained in desorber 1. By virtue of its construction, that is, bubble cap fractionator construction, the oil entering the top of desorber 2 is brought into intimate countercurrent contact with vapors and gases supplied to the base of the desorber 2 by compressor 22 through line 41.

The oil from the base of desorber 2 is cooled in cooler 7 and is admitted through control valve 8 to the top of desorber 3 in which it is countercurrently contacted with vapors entering the base of the desorber through pipe 17. Desorber 3 which essentially completes the removal of methane, is operated at a pressure equal to the sum of the vapor pressures of the ethane and heavier at the concentration and at the temperature existing at the base of the column.

Oil from the base of desorber 3 is passed through line 40 to still 9, a conventional bubble plate rectifying column, the operation of which is well known to those skilled in the art of petroleum refining. The still is refluxed with condensate formed by compression and cooling of the vapors taken overhead from this rectifying column.

A portion of the vapors from the reflux accumulator 13, sufficient to insure freedom from methane at the base of desorber 3, is passed through control valve 16 and line 17 to the base of desorber 3. The remainder of the vapors is compressed by compressor 18 and passed through cooler 19 to accumulator 20. Accumulator 20 is operated at a pressure equal to the sum of the partial vapor pressures exerted by the components which it is desirable to recover. The back-pressure regulator 21 at the top of the accumulator 20 serves as a control for the desorption. The back-pressure regulator is set to maintain the desired pressure in the accumulator. Any methane leaving the base of desorber 3 will tend to increase the pressure in the accumulator, causing the back-pressure regulator 21 to allow gas to pass through pipe 17 to the base of desorber 3.

It is to be noted that the oil stream from the base of desorber 1 is cooled in cooler 5 prior to its reduction in pressure through control valve 6 and that the stream of oil from the base of desorber 2 is cooled in cooler 7 prior to reduction in pressure through control valve 8. Gases and vapors from desorber 3 are compressed and delivered without cooling to the base of desorber 2. Likewise, gases and vapors from desorber 2 are compressed and delivered hot to the base of desorber 1. The handling of the oil and vapor streams in this manner is much superior to cooling the gases and vapors after compression and feeding warm oil to the tops of the desorbers.

While one modification of my process has been illustrated and described, it will be obvious to those skilled in the art that operating conditions such as temperatures and pressures, etc., will need be varied to obtain optimum operation dependent upon well head pressure and temperature, amount of hydrocarbons to be separated as natural gasoline or polymerization feed stock, as well as the relative amount of methane gas. In addition, the location of desorber and fractionator inlet and outlet lines may be varied to suit given conditions. Various modifications of flow of oil and gases may be made without departing from the spirit of my invention.

I claim:

1. A process for stabilizing crude oil comprising passing the oil through a series of desorbing zones of successively lower pressures to remove the methane, the methane gas separated in each succeeding desorber being compressed and injected without cooling into the preceding desorber, the partially demethanized crude oil from each desorber being cooled previous to pressure reduction and injection into the respective succeeding desorber, passing the demethanized crude oil through a rectification step to remove an overhead fraction comprising polymerization feed stock and natural gasoline, condensing the overhead fraction to produce liquid polymerization feed stock and natural gasoline, and removing the said liquid polymerization feed stock and natural gasoline and the thus stabilized crude oil.

2. A process for stabilizing crude oil comprising passing the oil through a series of desorbing zones of successively lower pressures to remove the methane, passing the demethanized crude oil through a rectification step to remove an overhead fraction comprising natural gasoline, condensing this overhead fraction to produce liquid natural gasoline and passing any uncondensed gases back to the last desorbing zone, then removing the condensed natural gasoline and the thus stabilized crude oil.

3. A process for stabilizing crude oil comprising passing the oil through a series of desorbing zones of successively lower pressure to remove the methane, the methane gas separated in each succeeding desorber being compressed and injected into the preceding desorber, passing the demethanized crude oil through a rectification step to remove an overhead fraction comprising natural gasoline, condensing this overhead fraction to produce liquid natural gasoline and passing any uncondensed gases back to the last desorbing zone, then removing the condensed natural gasoline and the thus stabilized crude oil.

4. A process for stabilizing crude oil comprising passing the oil through a series of desorbing zones of successively lower pressures to remove the methane, the methane gas separated in each succeeding desorber being compressed and injected into the preceding desorber without cooling, passing the demethanized crude oil through a rectification step to remove an overhead fraction comprising natural gasoline, condensing this overhead fraction to produce liquid natural gasoline and passing any uncondensed gases back to the last desorbing zone, then removing the condensed natural gasoline and the thus stabilized crude oil.

5. A process for stabilizing crude oil comprising passing the oil through a series of desorbing zones of successively lower pressure to remove the methane, the methane gas separated in each succeeding desorber being compressed and injected without cooling into the preceding desorber, the partially demethanized crude oil from each desorber being cooled previous to pressure reduction and injection into the respective succeeding desorber, passing the demethanized crude oil through a rectification step to remove an overhead fraction comprising natural gasoline, condensing this overhead fraction to produce liquid natural gasoline and passing any uncondensed gases back to the last desorbing zone, then removing the condensed natural gasoline and the thus stabilized crude oil.

6. A process for stabilizing crude oil comprising passing the oil through a series of desorbing zones of successively lower pressures to remove the methane, passing the demethanized crude oil through a rectification step to remove an overhead fraction comprising natural gasoline, condensing this overhead fraction to produce liquid natural gasoline and passing any uncondensed gases back to the last desorbing zone, then removing the condensed natural gasoline and passing a portion of the thus stabilized crude oil to the first desorbing zone to contact countercurrently the gas flowing back through the desorbing zones, and removing the remainder of the stabilized crude oil.

7. A process for stabilizing crude oil comprising passing the oil through a series of desorbing zones of successively lower pressures to remove the methane, the methane gas separated in each succeeding desorber being compressed and injected into the preceding desorber, passing the demethanized crude oil through a rectification step to remove an overhead fraction comprising natural gasoline, condensing this overhead fraction to produce liquid natural gasoline and passing any uncondensed gases back to the last desorbing zone, then removing the condensed natural gasoline and passing a portion of the thus stabilized crude oil to the first desorbing zone to contact countercurrently the gas flowing back through the desorbing zones, and removing the remainder of the stabilized crude oil.

8. A process for stabilizing crude oil comprising passing the oil through a series of desorbing zones of successively lower pressures to remove the methane, the methane gas separated in each succeeding desorber being compressed and injected into the preceding desorber without cooling, passing the demethanized crude oil through a rectification step to remove an overhead fraction comprising natural gasoline, condensing this overhead fraction to produce liquid natural gasoline and passing any uncondensed gases back to the last desorbing zone, then removing the condensed natural gasoline and passing a portion of the thus stabilized crude oil to the first desorbing zone to contact countercurrently the gas flowing back through the desorbing zones, and removing the remainder of the stabilized crude oil.

9. A process for stabilizing crude oil comprising passing the oil through a series of desorbing zones of successively lower pressures to remove the methane, the methane gas separated in each succeeding desorber being compressed and injected without cooling into the preceding desorber, the partially demethanized crude oil from each desorber being cooled previous to pressure reduction and injection into the respective succeeding desorber, passing the demethanized crude oil through a rectification step to remove an overhead fraction comprising natural gasoline, condensing this overhead fraction to produce liquid natural gasoline and passing any uncondensed gases back to the last desorbing zone, then removing the condensed natural gasoline and passing a portion of the thus stabilized crude oil to the first desorbing zone to contact countercurrently the gas flowing back through the desorbing zones, and removing the remainder of the stabilized crude oil.

SAMUEL C. CARNEY.